No. 740,877. PATENTED OCT. 6, 1903.
A. DE LASKI & P. D. THROPP.
CLENCHER TIRE FOR VEHICLE WHEELS.
APPLICATION FILED JULY 11, 1903.

NO MODEL.

Witnesses:
F. G. Hackenberg.
Henry Thieme.

Inventors:
Albert de Laski and
Peter D. Thropp.
By Brown & Seward
their Attorneys No. 740,877. Patented October 6, 1903.

UNITED STATES PATENT OFFICE.

ALBERT DE LASKI AND PETER DUNCAN THROPP, OF TRENTON, NEW JERSEY.

CLENCHER-TIRE FOR VEHICLE-WHEELS.

SPECIFICATION forming part of Letters Patent No. 740,877, dated October 6, 1903.

Application filed July 11, 1903. Serial No. 165,098. (No model.)

*To all whom it may concern:*

Be it known that we, ALBERT DE LASKI and PETER DUNCAN THROPP, citizens of the United States, and residents of Trenton, in the county of Mercer and State of New Jersey, have invented a new and useful Clencher-Tire for Vehicle-Wheels, of which the following is a specification.

Our invention relates to what are commonly known in the art as "clencher-tires" for vehicle-wheels. Our object is to provide a durable and efficient tire of this character at low cost.

Our invention contemplates the employment of a circular-woven tubular fabric to retain the inner elastic inflatable tube as well as the outer rubber coating of the tire in position.

Figure 1:
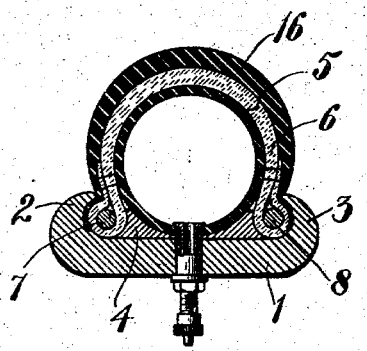
Figure 2:
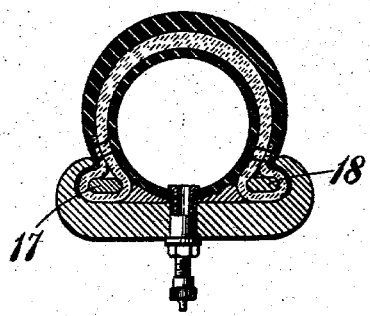
Figure 3:
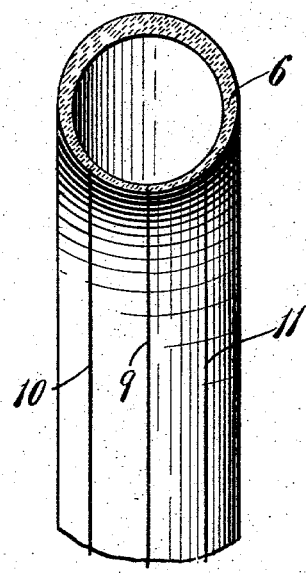
Figure 4:
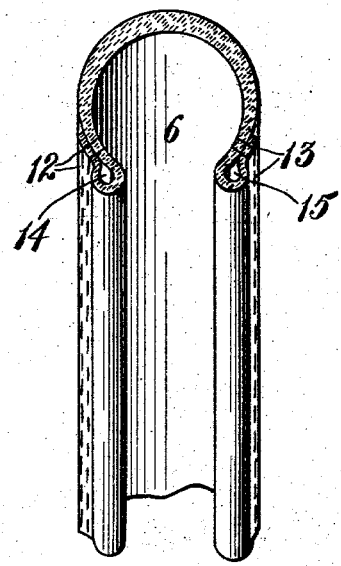

In the accompanying drawings, Figure 1 is a transverse section through the tire and wheel-rim, showing the position of the parts when the tire is adjusted for use. Fig. 2 is a similar view showing a modified form of clencher ring or hoop. Fig. 3 is a view looking toward the inner side of a portion of the circular-woven tubular fabric; and Fig. 4 is a view of the same, showing the edges where it has been severed turned back into the positions which they assume for holding the clencher rings or hoops in position.

The rim of the wheel is denoted by 1. It may be of any approved form suitable for use in connection with clencher-tires and is provided at its opposite edges with inwardly-curved portions (denoted by 2 and 3) for receiving the clencher rings or hoops embraced by the tubular fabric.

We have here shown the rim as provided with a spacing or seating piece 4 resting on its exterior, with its outer face curved to receive the inner inflatable tube 5 of the tire, and with its inner face fitted to rest upon the outer face of the rim 1. We have also shown the strip 4 as curved on its opposite edges to conform to the curve of the woven fabric where it embraces the clencher rings or hoops.

The circular-woven tubular fabric is denoted by 6, and its edges are shown as embracing the clencher rings or hoops 7 and 8, these rings or hoops being shown in Fig. 1 as circular in cross-section. These rings or hoops may be steel-wire hoops or hoops of any other suitable material so fitted as to be adjusted to the rim and serve to prevent the elongation or creeping of the tire on the rim when the wheel is in use, as well as providing a shoulder for the engagement of the opposite ends 2 and 3 of the rim.

The circular-woven tubular fabric 6 is provided at the time of its weaving (see Fig. 3) with threads, preferably three in number, (denoted by 9, 10, and 11,) said threads being differentiated in color or otherwise from the warp-threads of the fabric and one of them, 9, being located at the crown of the inner face of the tubular fabric to indicate the line along which the tubular fabric is to be cut in order to provide the edges to be subsequently folded over the clencher rings or hoops 7 and 8. The other threads, 10 and 11, are employed to indicate the crowns of the bights of the folds made by turning back the edges over onto the outside of the fabric, as clearly shown in Figs. 1, 2, and 4.

When the circular-woven tubular fabric 6 has been completed and the tube cut along the line 9 and edges bent over, as shown in Fig. 4, these turned-over edges are firmly secured, by means of lines of stitching 12 and 13, to the body of the fabric, leaving spaces 14 and 15 for the insertion of the rings or hoops 7 and 8, or the edges may be turned over the rings or hoops 7 and 8 instead of subsequently inserting the rings or hoops in the spaces 14 and 15.

In completing the tire the rubber tread or covering 16 may be applied to the exterior of the woven part 6 after the latter has been placed in position on the curing-arbor before being placed in the mold, the said tread or covering 16 being preferably extended downwardly and partially over the parts of the fabric which surround the rings or hoops 7 and 8 in order that the ends 2 and 3 of the rim may hold all parts securely in position.

In Fig. 2 we have shown the clencher rings or strips 17 and 18 as oblong in cross-section instead of circular, and it is obvious that other shapes than those shown may be utilized, as experience may require or as may be found desirable to suit the tires to different forms of rims.

The circular-woven tubular fabric which forms the reliable body of the tire to hold the other parts in the proper positions has the advantage of having its hoop and weft in the normal positions in which they were woven, and hence there is no tendency on the part of this body of the tire to creep out of the circular form in which it was woven, and the manner of its production is such that it will admit of introducing heavier yarns at the outer and lighter yarns at the inner portions, thus materially increasing its body where the greatest strain is liable to occur. Furthermore, the turning back of the entire fabric over onto itself provides seats for the annular rings or hoops of great durability and strength, while at the same time the fold is not clumsy and is entirely hidden from view by the upper coating of rubber after the turned-over edges have been securely fastened. The introduction of the threads at the time of weaving the circular tubular fabric also serves to expedite the cutting of the tube and the folding of its edges along lines which correspond to the warp-threads of the fabric, so that the lines of cut and fold will be true with respect to the lines of warp and will not weaken the fabric by cutting the warp-threads.

What we claim is—

1. In a clencher-tire, a circular-woven tubular fabric cut along its inner face and having its edges turned back onto the body portions to form pockets for the reception of the clencher rings or hoops.

2. A fabric blank for a clencher-tire consisting of a circular-woven tubular fabric provided with a line along the crown of its inner face, the said line being differentiated in appearance from the fabric in proximity thereto for indicating the path along which the tubular fabric is to be cut.

3. A fabric blank for a clencher-tire comprising a circular-woven tubular fabric provided with a line along the crown of its inner face and lines spaced from said crown-line and extending parallel therewith, the said lines being differentiated in appearance from the fabric adjacent thereto to indicate the lines of cut and the lines of fold.

4. A clencher-tire comprising an inner inflatable tube, a circular-woven tubular fabric embracing said tube, the said circular-woven tubular fabric being cut and having its opposite edges folded back and secured to the body portion to form pockets for the clencher rings or hoops located in said pockets and a rubber tread or covering applied to the exterior of said woven fabric.

In testimony that we claim the foregoing as our invention we have signed our names, in presence of two witnesses, this 8th day of June, 1903.

ALBERT DE LASKI.
PETER DUNCAN THROPP.

Witnesses:
  FREDK. HAYNES,
  HENRY THIEME.